United States Patent [19]

McCullough

[11] Patent Number: 4,575,938

[45] Date of Patent: Mar. 18, 1986

[54] MEAT TRIMMING KNIFE

[76] Inventor: Timothy J. McCullough, 833 Aurora Rd., Vermilion, Ohio 44089

[21] Appl. No.: 630,005

[22] Filed: Jul. 12, 1984

[51] Int. Cl.[4] .................... A22C 17/04; B26B 15/00

[52] U.S. Cl. .................................... 30/276

[58] Field of Search ................ 30/276, 240, 286, 293, 30/347; 17/1 G; 83/698

[56] References Cited

U.S. PATENT DOCUMENTS

| | | | |
|---|---|---|---|
| 2,827,657 | 3/1958 | Bettcher . | |
| 3,024,532 | 3/1962 | Bettcher . | |
| 3,269,010 | 4/1964 | Bettcher . | |
| 4,166,317 | 9/1979 | Bettcher | 30/276 |
| 4,170,063 | 10/1979 | Bettcher . | |
| 4,178,683 | 12/1979 | Bettcher . | |
| 4,236,531 | 12/1980 | McCullough . | |
| 4,363,170 | 12/1982 | McCullough . | |
| 4,439,924 | 4/1984 | Bettcher | 30/276 |

*Primary Examiner*—E. R. Kazenske
*Assistant Examiner*—Willmon Fridie, Jr.
*Attorney, Agent, or Firm*—Michael Sand Co.

[57] ABSTRACT

An improved hand held meat trimming knife of the type which has a ring-like blade rotatably mounted on a blade holder for trimming meat from bones. The holder is mounted on a frame which is attached to a handle. The frame includes a pair of arcuate shaped arms on which the blade holder is secured by a pair of attachment bolts. One of the arms is formed integrally with the frame and the other is removably secured thereto by a locking collar slidably mounted on the handle. The blade holder has sufficient resiliency enabling it to remain attached to the removable arm and be expanded outwardly from the remaining portion of the frame upon disengagement of the arm from the frame enabling a blade to be easily installed on and removed from the expanded holder. The holder is formed with a blade supporting channel throughout a major portion of its circumference to trap and mount the blade thereon. An adjusting means is formed on the integrally attached arm for adjusting the inner diameter of the blade holder to compensate for wear of the blade and holder to prevent a smooth running engagement therebetween.

22 Claims, 23 Drawing Figures

FIG. 3
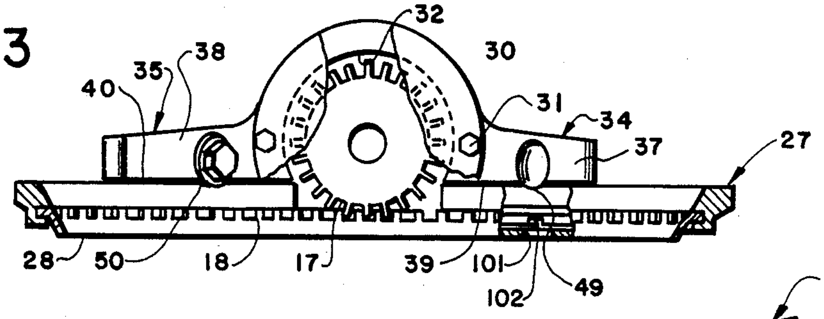
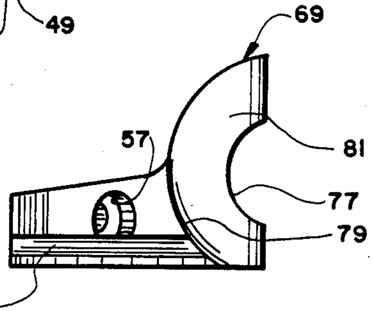
FIG. 12
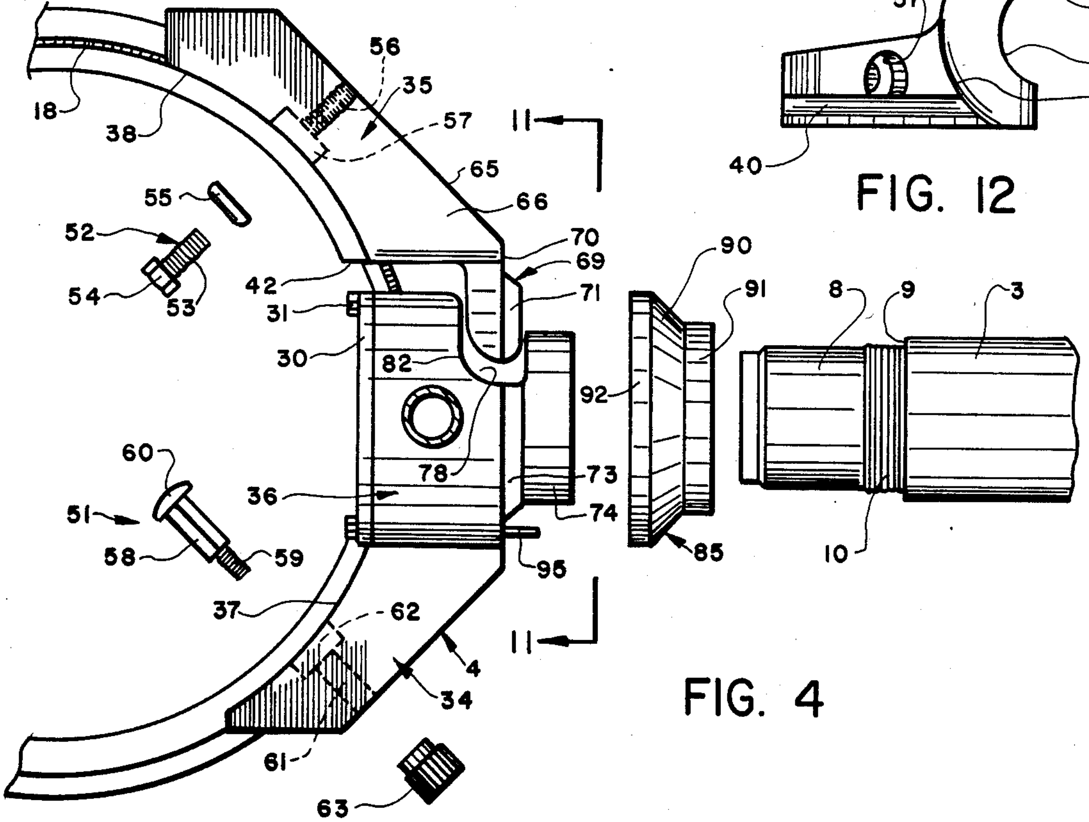
FIG. 4
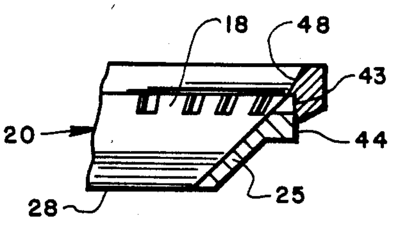
FIG. 9
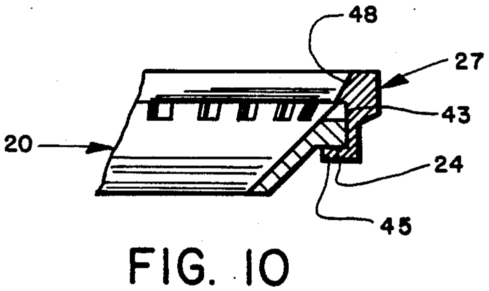
FIG. 10

MEAT TRIMMING KNIFE

TECHNICAL FIELD

The invention relates to meat-cutting devices and particularly to a power-driven meat-cutting knife adapted to be manually held and manipulated for the quick and easy removal of meat from carcasses and bones. More particularly, the invention relates to an improved knife in which a ring-shaped cutting blade can be removed and installed quickly and easily on a complementary shaped blade holder mounted on the front end of the knife without the complicated removing or loosening of any mounting or adjusting screws as heretofore required.

BACKGROUND ART

Various styles of power-driven meat-cutting tools have been devised wherein a ring blade is rotatably mounted on a holder which in turn is mounted on a manually operated, power-driven handle or handpiece. These tools have been used for some time to facilitate the removal of meat from a carcass, primarily in a trimming operation or for removing the meat remains from the bones. These meat-cutting tools are either electrically or pneumatically driven. Some examples of these prior meat-cutting tools are shown in U.S. Pat. Nos. 3,269,010; 3,852,882; 4,179,063; 4,178,683; 4,198,750 and 4,324,043.

These power driven tools or trimming knives as they are generally referred to in the industry, consist of a tubular handle terminating in a generally arcuate shaped front end and formed with a hollow bore extending throughout the longitudinal length of the handle. An annular blade holder is attached to the arcuate front end of the handpiece with the ring blade being removably mounted thereon by various mounting arrangements. The blade is formed with gear teeth extending around the top thereof, which are in driving engagement with a pinion gear rotatably mounted within the bore of the handle adjacent the front end of the handpiece.

In electrically driven knives a flexible cable, one end of which is connected to a motor located adjacent to the work area, enters the rear of the handle and extends through the bore and terminates in a squared end. The squared end is engaged in a complementary shaped opening formed in the rear of the pinion gear for rotatably driving the gear. In pneumatically driven knives a squared shaft end of the air motor is engaged in the rear opening of the pinion gear for driving the gear.

These trimming knives have various size diameter blade holders and cutting blades mounted thereon depending upon the particular meat trimming operation for which the knives are to be used. One particular type such as shown in U.S. Pat. No. Re. 25,947 has a blade with a diameter of approximately five inches. This blade is rotatably supported on a blade holder which is mounted on the end of the handpiece by a pair of adjusting bolts which are threadably engaged in holes formed in a curved end surface of the handpiece. A curved metal retaining member extends partially outwardly along the circumference of the blade and provides support for the blade throughout a predetermined arcuate distance. This mounting arrangement provides three separate attachments or contact points for rotatably mounting the blade on the front end of the handpiece.

Such a blade mounting arrangement has several disadvantages in that when the blade must be removed for sharpening or replacement it is difficult for the operator to perform the same at the meat cutting station since the three blade attachment or mounting bolts must be loosened for removing the blade. These three bolts then must be adjusted to properly mount a new or sharpened blade on the handpiece. Quite often these three bolts are not adjusted properly by the operator and a binding action or excessive vibration will occur between the blade and holder effecting the efficiency of the trimming knife.

Another problem with such prior blade mounting arrangement is that the outermost end of the blade is unsupported by the blade holder and occasionally the operator will "pick up" the knife from the meat during a cutting procedure which will cause the cutting blade to move away from the blade holder permitting meat to enter therebetween causing jamming of the blade with respect to the holder.

U.S. Pat. No. 4,439,924 discloses a trimming knife which attempts to eliminate this blade replacement problem by providing a pivotally mounted arcuate shaped lever or shoe which traps the blade in the blade holder. This patent also attempts to eliminate the wear problem of the blade and housing to provide a satisfactory fit between the rotating blade and housing by means of a thumb screw which presses against the blade retaining shoe. Although the trimming knife of this patent may eliminate some of the problems, it results in a knife of a relatively complicated construction which increases the number of components and correspondingly the number of parts which must be manufactured and assembled and thus increases the cost of the final unit.

Many of these problems have been eliminated by my U.S. Pat. No. 4,494,311. Although this prior trimming knife eliminates many of the problems, it does not provide adjustment to compensate for wearing of the blade and housing which occurs after a period of use. This wear can result in undesirable vibration between the housing and blade. Also this knife requires more parts and manufacturing operations than desired to achieve the rapid blade change feature.

Thus, the need has existed for an improved meat trimming knife of the type using a ring-like cutting blade, in which the knife is provided with means for rotatably mounting the blade on the blade holder and handpiece and which enables an operator to quickly and easily remove and install a blade from and on the holder without requiring special skills for accomplishing the same.

DISCLOSURE OF THE INVENTION

Objectives of the invention include providing an improved meat trimming knife of the type having an annular blade holder mounted on the front end of a concavely-shaped frame for rotatably mounting a ring blade therein; in which the improved knife includes a tubular shaped handle removably connected to the central portion of the frame, which frame has a pair of arcuate shaped arms extending outwardly from said central portion on which the blade holder is removably mounted; and in which one of said arms is removably mounted on the frame and can be moved outwardly from the frame to expand the inside diameter of the attached blade holder to enable a blade to be removed from and installed on the blade holder easily and conveniently without requiring complicated and time consuming manipulations of adjusting screws and/or attachment bolts. Another objective is to provide such a trimming knife in which the blade holder is split at one position on its circumference which corresponds with the junction zone between the removable arcuate shaped arm of the frame and the central portion thereof which split is offset from the pinion gear thereby reducing the amount of meat entering this area and possibly jamming the driving engagement with the ring blade teeth as heretofore occurs; and in which the removable arm is clamped in the blade retaining position on the frame by a collar slidably mounted on the tubular handle.

Still another objective of the invention is to provide such an improved meat trimming knife in which the split in the blade holder and frame is spaced circumferentially from the axial centerline of the knife and the location of the pinion gear enabling sufficient metal material to be provided on the blade holder and located adjacent the pinion gear to assist in absorbing the downward driving force component exerted by the pinion gear when meshingly engaged with the blade which heretofore was a problem with prior ring blade holders that are split at the location of the pinion gear resulting in a weakened area subjecting it to rapid and excessive wear. Another objective is to provide such a trimming knife in which adjustment means is provided on the integrally attached arcuate shaped arm which enables the inner diameter of the blade holder to be adjusted to compensate for wear on the blade holder and blade to provide a smooth running blade thereby reducing vibration between the blade and blade holder.

A still further objective of the invention is to provide such an improved meat trimming knife in which the outer end of the blade may be untrapped by the blade holder thereby providing a streamlined profile uneffected by reduction in the axial length of the cutting blade as it decreases from repeated sharpening during its life and uneffected by protruding blade retaining flanges; and in which the blade is firmly trapped by a radially inwardly extending wall of the blade holder which extends throughout an arcuate length of more than 180° from adjacent the mounting frame circumferentially toward the untrapped outer portion thereof which provides an efficient cutting action and cutting area at the outer end of the blade without sacrificing blade support. Another objective is to provide such a meat trimming knife which uses existing handpiece configurations and many of the elements thereby eliminating the operators from developing their skill with a different design, and which knife has fewer parts than heretofore required in prior trimming knives having such quick blade replacement and blade adjustment features. A further objective is to provide such a trimming knife in which the inside diameter of the blade holder is adjusted easily to compensate for wear by a simple hand manipulated tool which is inserted into an opening formed in the integrally connected arcuate shaped arm of the frame and engaged in a notch formed in the blade holder; and in which the locking collar which secures the removable arm in the blade securing position has a conical inner surface which abuts a similar shaped conical surface formed on the rear of the frame which draws and clamps tightly together the removable arm and frame by simple rotation of the tubular handle.

These objectives and advantages are obtained by the improved meat trimming knife, the general nature of which may be stated as including a handle; a frame secured to the front end of the handle having a central portion and a pair of outwardly extending arms with one of said arms being removably mounted with respect to the central portion of the frame for movement between a blade securing position and a blade removal position; a ring-like blade holder mounted on the frame, said holder being split at one location on its circumference; a ring blade rotatably mounted on the blade holder and clamping means engageable with the frame for securing said removably mounted arm in the blade securing position on the frame.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 3 is an enlarged fragmentary sectional view with portions broken away, looking in the direction of arrows 3—3, FIG. 1;

FIG. 4 is an enlarged fragmentary top plan view similar to FIG. 2 with the knife being shown in an exploded condition;

FIG. 9 is an enlarged fragmentary sectional view taken on line 9—9, FIG. 2;

FIG. 10 is an enlarged fragmentary sectional view taken on line 10—10, FIG. 2;

FIG. 12 is a front elevational view of the removably mounted arcuate shaped arm shown removed from the remainder of the frame;

Similar numerals refer to similar parts throughout the drawings.

BEST MODES FOR CARRYING OUT THE INVENTION

Figure 1:
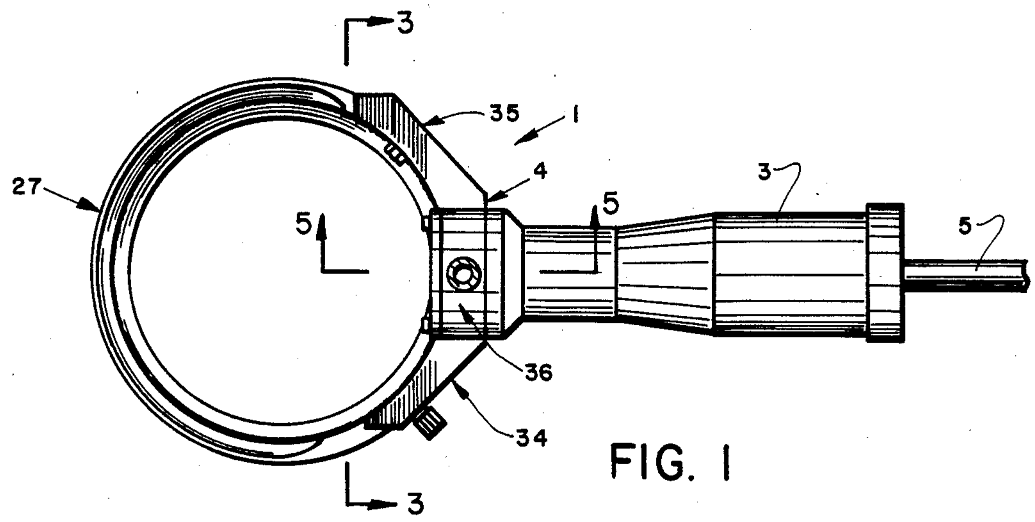
FIG. 1 is a top plan view of the improved meat trimming knife with the grease cup stem being shown in section.

One embodiment of the improved meat trimming knife is indicated generally at 1, and is shown in FIG. 1 as an electrically driven style knife. Knife 1 includes a tubular handle 3 and an arcuate shaped blade attachment frame 4. Knife 1 is adapted to be connected to an electric motor by a flexible power driven cable 5. The electric motor is usually supported by a hanger located closely adjacent a work table on which a meat trimming operation is being performed with knife 1.

Figure 5:
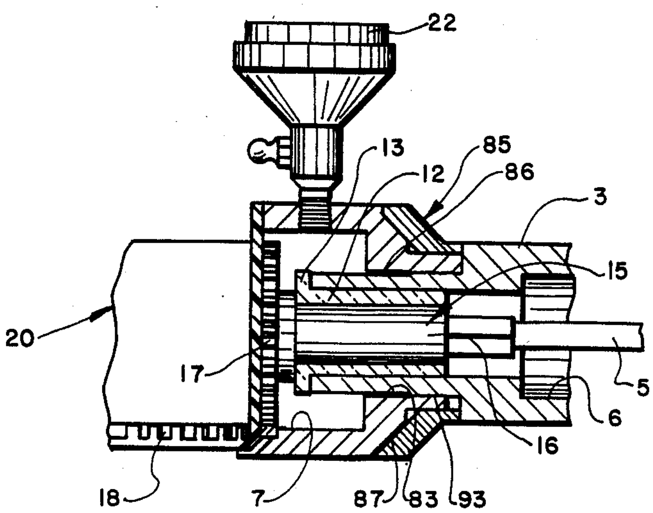
FIG. 5 is an enlarged fragmentary sectional view taken on line 5—5, FIG. 1 with the grease cup being shown in elevation.

Tubular handle 3 is formed with a central bore 6 which communicates with a central bore 7 formed in frame 4 (FIG. 5). Handle 3 terminates in a reduced diameter cylindrical front portion 8 connected to the rear portion of the handle by an annular shoulder 9. Portion 8 includes a threaded area 10 located adjacent shoulder 9. A bronze bushing 12 having a flared front end 13 is mounted in bore 7 of frame 4 and provides the bearing surface for rotatably mounting a pinion gear 15 therein. Gear 15 includes a cylindrical shaft 16 and gear teeth 17 which meshingly engage the gear teeth 18 formed about the top surface of a ringshaped cutting blade 20. The opposite end of gear shaft 16 is formed with a square hole 14 in which a complementary shaped squared end 21 of drive cable 5 is connected for driving the pinion gear within bushing 12. A usual grease cup 22 is mounted on frame 4 to provide a supply of lubricating grease to meshing gear teeth 17 and 18 as shown in FIG. 5.

Figure 7:
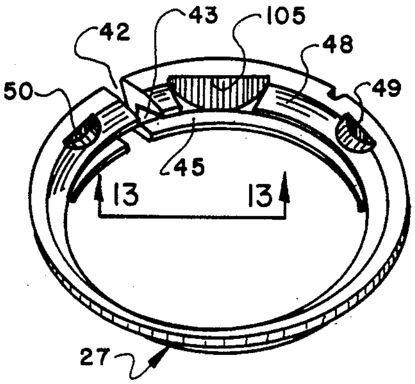
FIG. 7 is a perspective view of the blade holder of FIG. 1 removed from the supporting frame.

Blade 20 is of a usual construction with blade driving gear teeth 18 extending circumferentially about the top of the blade. A radially inwardly extending annular surface 24 is formed between gear teeth 18 and conical blade wall 25 to slidably mount blade 20 on an improved blade holder indicated generally at 27 (FIG. 7). The other end of blade 20 terminates in an annular cutting edge 28 (FIGS. 9 and 10). A nylon end plate 30 is attached by a pair of bolts 31 to the inner surface of frame 4 to prevent meat from entering an annular recess 32 formed therein and jamming the meshing engagement of gear teeth 17 and 18 which occurs within the recess.

In accordance with one of the features of the invention, arcuate shaped blade attachment frame 4 is formed by a pair of generally arcuate shaped arms indicated at 34 and 35 and a central portion 36. Arm 34 is formed integrally with generally cylindrical shaped central portion 36 and extends in a curved concaved arrangement therefrom. Arm 35 is detachable from central portion 36 which provides the quick blade removal and installation feature of the improved trimming knife. Arms 34 and 35 include inner generally concavely shaped front surfaces 37 and 38 respectively (FIGS. 3 and 4) provided with arcuate shaped grooves 39 and 40, respectively (FIG. 3) for receivably mounting blade holder 27 therein in a usual manner.

Blade holder 27 (FIG. 7) is a ring-like annular shaped metal member having a split 42 at one point in its periphery, an annular axially extending wall 43 against which the outer axially extending annular wall 44 of ring blade 20 slidably engages, and a blade retaining radially inwardly extending wall 45 (FIG. 10) which traps and slidably supports the radially extending annular wall portion 24 of blade 20. Wall 45 preferably extends circumferentially about the blade housing an arcuate length of approximately 220° although this distance may vary without effecting the concept of the invention. This arcuate distance leaves an untrapped outer portion on blade holder 27 (FIG. 9) of approximately 140° which provides a better contour in the area where most of the meat cutting occurs. However, due to the relatively large arcuate length of wall 45, blade 20 is securely trapped therein. The inner surface 48 of blade holder 27 is generally conical as shown particularly in FIGS. 9 and 10.

In accordance with another feature of the invention surface 48 is thicker adjacent split 42 which is located adjacent to, but off center from, the axial centerline of frame 4 and handle 3 to increase its strength and rigidity. A pair of flat surfaces 49 and 50 are formed in an upper portion of conical inner surface 48 to provide an area for the clamping of blade holder 27 within grooves 39 and 40 of surfaces 37 and 38 by a pair of attachment bolts indicated generally at 51 and 52. Attachment bolts 52 include a threaded shaft 53 and a hexagonal shaped head 54 and a clamping washer 55. Threaded shaft 53 is engaged within a threaded opening 56 formed in arm 35 (FIG. 4) with washer 55 being located with a counterbore 57 and clampingly engaged with flat surfaces 50 of blade holder 27. Attachment nut 51 includes a square shank 58, a reduced diameter threaded end 59, and a clamping head 60. Shank 58 and clamping head 60 are mounted within complementary shaped bores 61 and 62, respectively, formed in arm 34 with a thumb nut 63 being threadably engaged with threaded shank end 59. Head 60 is clamped against flat surface 49 of blade holder 27.

Figure 2:
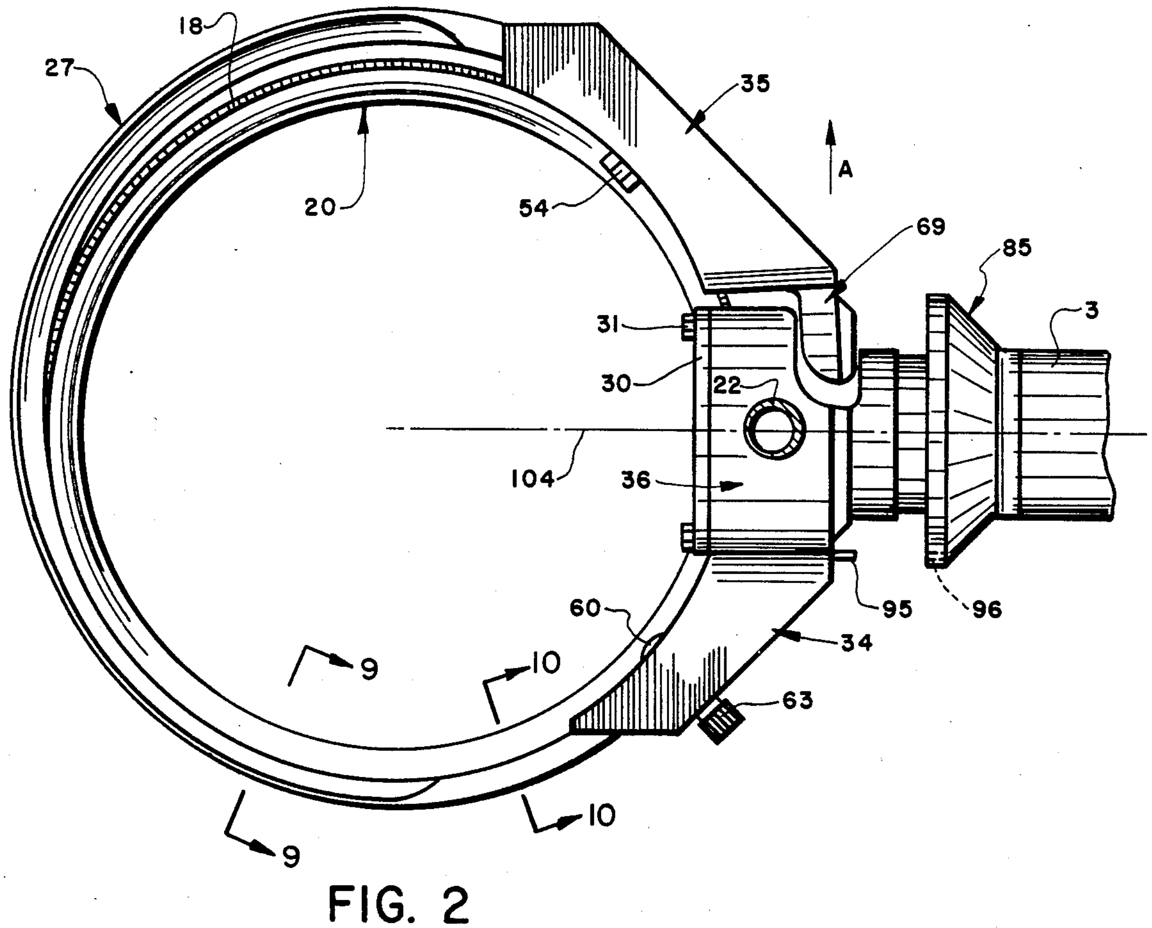
FIG. 2 is an enlarged fragmentary top plan view of the trimming knife of FIG. 1 being shown in the open blade release position with the removably mounted arm being shown in a disengaged position from the handle.
Figure 11:
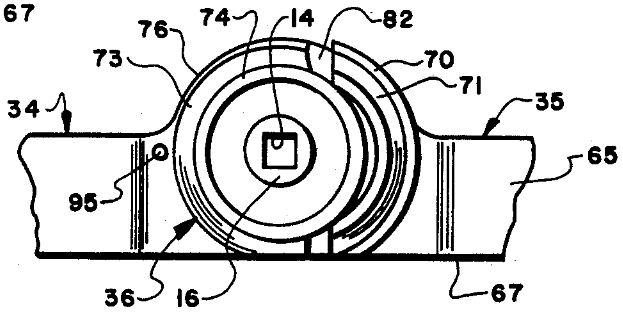
FIG. 11 is a fragmentary elevational view looking in the direction of arrows 11—11, FIG. 4.
Figure 16:
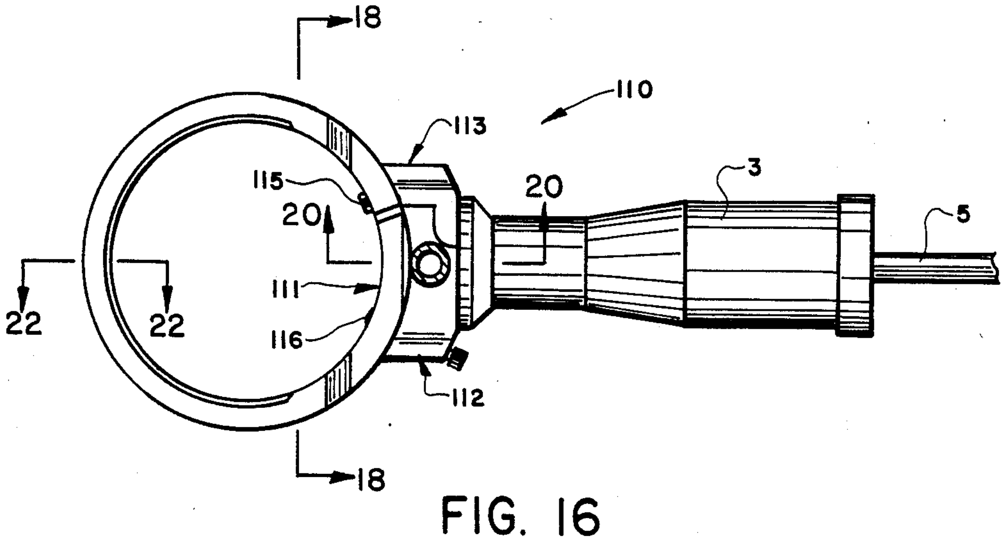
FIG. 16 is a top plan view similar to FIG. 1 showing a modified form of the improved trimming knife.
Figure 17:
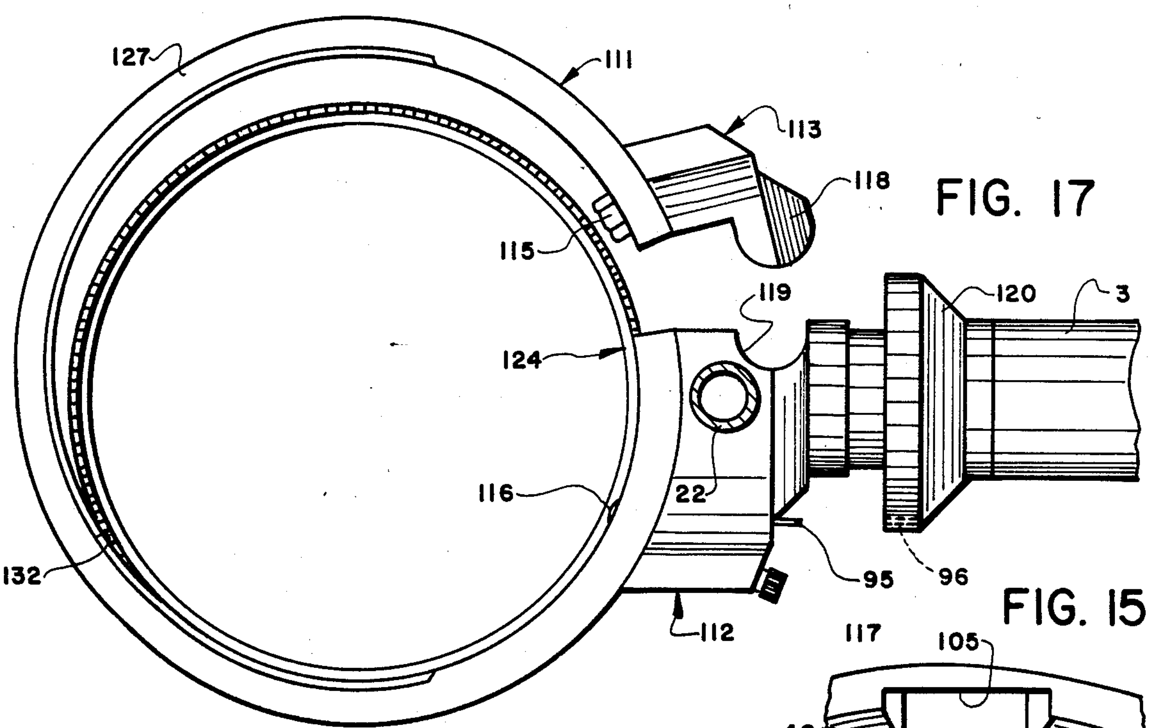
FIG. 17 is an enlarged top plan view similar to FIG. 2 of the modified trimming knife of FIG. 16 shown in an open blade release position.

In accordance with one of the main features of the invention, arm 35 is removably mounted with respect to arm 34 and central portion 36 as shown particularly in FIGS. 2 and 4. Removably mounted arm 35 includes generally arcuate shaped inner surface 38 and groove 40 as described above in which blade holder 27 is clamped by bolt 52. Arm 35 preferably has a flat rear surface 65 and flat top and bottom surfaces 66 and 67. The inner end of arm 35 (FIGS. 11 and 12) is formed with a curved portion indicated generally at 69, having a curved arcuate flat outer surface 70 with a conical segment 71 extending rearwardly therefrom. Conical segment 71 is a portion complementary to and removed from a conical projection 73 formed integrally with and extending rewardly from central portion 36 of blade attachment frame 4.

Figure 6:
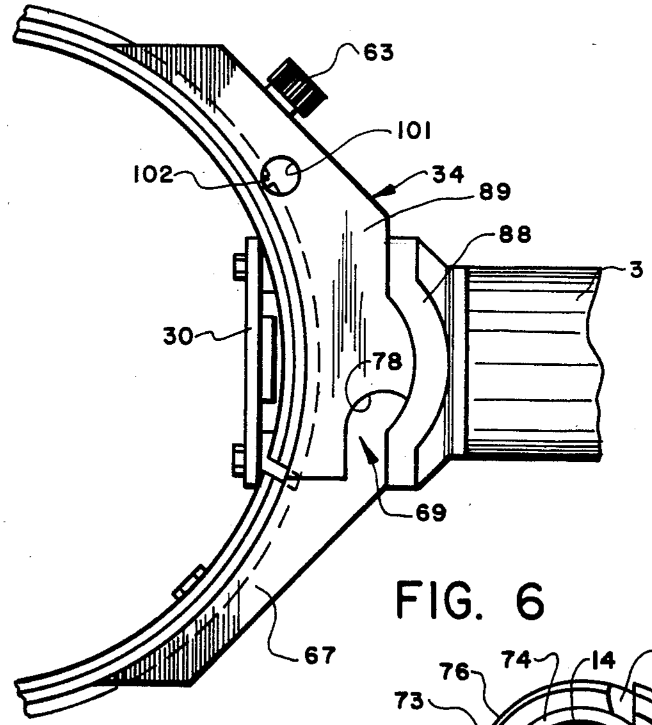
FIG. 6 is an enlarged fragmentary bottom plan view of the frame shown in a closed blade retaining position.

Conical projection 73 terminates at one end in an outer cylindrical wall 74 and at the opposite end in an arcuate flat surface 76 which is complementary with flat surface 70 of arm 35. Thus when arm 35 is in a closed blade retaining position as shown in FIG. 6, curved portion 69 extends into a complementary shaped cutout 78 formed in central portion 36. The inner end of arm 35 adjacent portion 69 terminates in an arcuate curved surface 79 (FIG. 12) which when in the blade retaining position abuts against the curved outer surface of cylindrical shaped central portion 36. The inner surface 81 of curved portion 69 is flat and is complementary with and is clampingly engaged with a complementary shaped surface 82 formed on the rear of central portion 36 by cutout 78. The edge 77 of projection 69 is formed with a concave section of a circle which forms a wall portion of a circular bore 83 of central portion 36 (FIG. 5) in which pinion gear shank 16 is located.

Arm 35 is secured in a blade securing position with projection 69 being clamped within cutout 78 of central portion 36 by an annular clamping or locking collar, indicated generally at 85 (FIGS. 2, 4, 5, and 6). Collar 85 includes a central bore 86 which is complementary with and is adapted to telescopically receive the cylindrical wall 74 of central portion 36 and is mounted thereon as shown in FIG. 5. Collar 85 further includes a conical inner surface 87 which is complementary to the combined abutting conical portion of central portion 36 and conical segment 71 of projection 69. A flat 88 is formed at one location on the circumference of collar 85 to match with the bottom surface 67 of arm 35 and bottom surface 89 of arm 34 (FIG. 6). The outer surface of collar 85 includes a conical wall 90 which terminates at one end in a short cylindrical portion 91 and at the other end in a larger diameter cylindrical portion 92. Cylindrical portion 91 abuts against annular shoulder 9 of handle 3 when in the blade retaining position with cylindrical portion 92 generally abutting combined flat arcuate surfaces 70 and 76 of arm 35 and central portion 36 respectively.

Collar 85 clamps arm 35 against central portion 36 by the engagement of threaded area 10 of handle 3 with threads 93 (FIG. 5) formed on the interior of cylindrical portion 74 of central portion 36 which forms bore 83. Advancement of this threaded connection will force the inner conical surface 87 of collar 85 tightly against and into clamping engagement with combined conical surfaces 71 and 73 of arm 35 and central portion 36 to force projection 69 of arm 35 inwardly into cutout 78 and axially against the rear of central portion 36. Handle 3 is rotatably advanced until an extremely tight clamping engagement is achieved as shown in FIG. 6 forming an assembled arcuate shape blade attachement frame 4 similar to the front end of existing trimming knives not having this removable or breakaway arm feature.

The main purpose of removable arm 35 is to permit the rapid installation and removal of blade 20 with respect to blade holder 27. Blade holder 27 is formed of a heat tempered steel which has a sufficient amount of spring or resiliency therein so that a trimming knife operator upon retracting collar 85 to the position as shown in FIG. 2 can easily swing arm 35 in the direction of arrow A which increases the inside diameter of the blade holder enabling the blade to be removed easily from its former entrapment by radially inwardly extending wall 45 of blade holder 27. Another blade then can be installed easily on the blade holder while the arm is in the open position of FIG. 2. After installation of a new blade, arm 35 is closed in an opposite direction to that of arrow A and handle 3 rotated until collar 85 tightly clamps curved projection 69 within cutout 78. The resiliency of expanded blade holder 27 will bias arm 35 toward the closed position facilitating its clamping engagement within cutout 78.

A pin 95 preferably is embedded in and extends outwardly from annular flat surface 76 of central portion 36 and is received within a complementary shaped hole 96 formed in conical surface 87 of collar 85 to prevent rotation of the collar as it is being moved axially into clamping engagement with central portion 36. Pin 95 insures that flat surface 88 of the collar aligns with bottom surface 89 of arm 34 when in the closed position.

Thus, an operator to change a blade at the trimming station merely rotates handle 3 a sufficient distance rearwardly to enable locking collar 85 to be moved axially rearwardly as shown in FIG. 2 permitting curved portion 69 of arm 35 to be moved out of cutout 78 expanding the inner diameter of blade holder 27 a sufficient distance enabling the blade 20 to be easily removed therefrom. Likewise, to reinstall a new blade arm 35 is moved in the other direction with curved portion 69 entering cutout 78 after which handle 3 is rotated in the opposite direction axially moving collar 85 into clamping engagement with curved portion 69 and central portion 36 of frame 4. Neither of the blade holder attachment bolts 51 or 52 need be adjusted or manipulated by the operator. Likewise, no tool is required for changing a blade 20 from blade holder 27. This blade changing operation can be performed in a matter of several seconds by an operator at the meat trimming station eliminating the heretofore requirement of maintenance personnel taking the knife to the maintenance shop for removal and installation of a sharpened or new blade in the blade holder.

Figure 8:
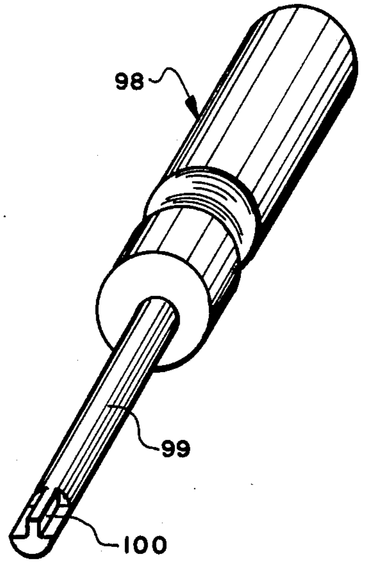
FIG. 8 is a perspective view of the blade holder adjustment tool.

In accordance with another feature of the invention, improved knife 1 permits the mating diameter of the blade and blade holder to be adjusted to provide for a smooth running engagement therebetween even after wearing of the blade holder and blade after considerable use at a meat trimming station. This adjustment is accomplished by an adjusting tool of the type shown in FIG. 8 and indicated generally at 98. Adjustment tool 98 has a cylindrical shank 99, the outer end of which is machined to form a rectangular shaped projection 100 therein. A circular hole 101 (FIG. 6) is formed in bottom surface 89 of integrally formed arcuate arm 34 and communicates with the outer surface of blade housing wall 45. A notch 102 is formed in wall 45 complementary with tool projection 100 which is adapted to be engaged therein. The operator by loosening thumb nut 63 will release the clamping pressure of bolt head 60 against flat surface 49 of blade holder 27. A slight rotation on the tool 98 when engaged with notch 102 will slide the portion of the blade holder 27 retained in groove 39 of arm 34, a slight amount (thousandths of an inch) toward central portion 36 reducing very slightly the inside diameter of holder 27 to compensate for wear. Attachment nut 52 remains in its secured clamping position against the other end of blade holder 27 and arm 35. Thumb nut 63 then is retightened to securely clamp bolt head 60 against blade holder 27 when in the adjusted position. Thus an operator during a meat trimming procedure upon noticing the blade developing excess vibration due to wear of the blade holder and/or blade can merely loosen thumb nut 63, and by a slight rotation of tool 98 can compensate for the slight amount of wear, after which thumb nut 63 is tightened to clamp the blade holder in the adjusted smooth running position. This adjustment procedure can be carried out in a matter of seconds enabling an operator to maintain the most efficient operation of improved meat trimming knife 1 thereby increasing the amount of meat trimmed from the bone and reducing stress on the operator's hand due to the reduced vibration.

Figure 15:
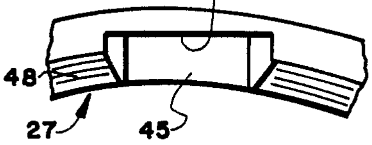
FIG. 15 is a fragmentary plan view looking in the direction of arrows 15—15, FIG. 13.

Another important feature present in improved meat trimming knife 1 is the continuous material in the area of the pinion gear. This is shown particularly in FIGS. 13, 14, and 15. This continuous material is possible since split 42 in blade holder 27 is offset from the axial center line of the frame and handle and therefore the pinion gear instead of being on the same center line as occurs in prior trimming knives using such pinion gear driven circular trimming blades. The axial center line of pinion gear 15 and of handle 3 is indicated by dot dash line 104 in FIGS. 2 and 13. A semicircular recess 105 formed in blade holder 27 provides the running area for teeth 17 of pinion gear 15. Most importantly blade supporting wall 45 extends continuously beneath recess 105 which provides a solid support for the blade at the area where the greatest amount of force is exerted thereon.

Figure 13:
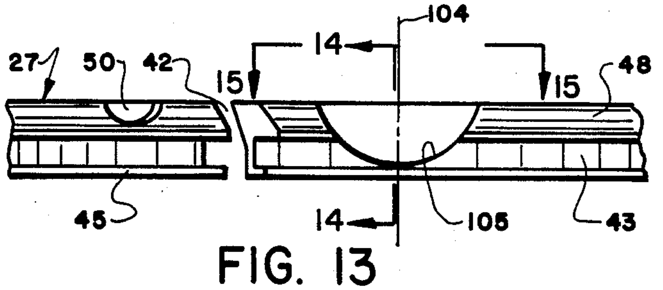
FIG. 13 is a greatly enlarged fragmentary elevational view looking in the direction of arrows 13—13, FIG. 7.
Figure 14:
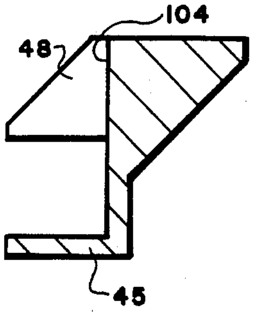
FIG. 14 is a further enlarged fragmentary sectional view taken on line 14—14, FIG. 13.
Figure 18:
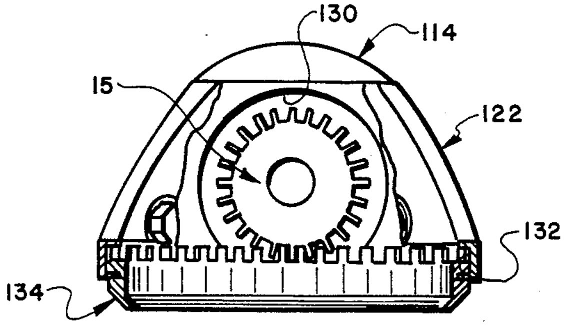
FIG. 18 is a fragmentary sectional view, with portions broken away, taken on line 18—18, FIG. 16.

In driving blade 20 by the meshing engagement of pinion gear teeth 17 and blade teeth 18 which occurs within recess 105, a downward force component is exerted on the blade and blade supporting wall 45 at the area just beneath recess 105. Heretofore, even though a blade supporting wall was located generally beneath such a recess, the wall was split in this area as well as split in the other portions of the holder in the recess area. This resulted in a weakened area in the blade holder which increased the wear on the holder and blade shortening the life thereof. As can be seen in FIG. 13, the blade housing split 42 is removed from the pinion gear driving area 105 and blade supporting wall 45 extends completely beneath the blade driving area of recess 105. Also, wall 106 which is located behind and which forms recess 105 is thicker than in most known blade holders increasing still further the rigidity of the blade holder in the pinion gear driving area.

A modified form of the improved meat trimming knife is indicated generally at 110, and is shown in FIGS. 16 through 23. Knife 110 is generally intended for use with a smaller diameter blade than knife 1 and is similar in most respects except for the various differences described below. One of the main differences is the construction of the blade holder which is shown particularly in FIG. 21 and indicated by numeral 111. Also, the relatively elongated arcuate shaped arms 34 and 35 of knife 1 are replaced by relatively shorter arms 112 and 113. Arms 112 and 113 extend outwardly from a generally cylindrical central body portion 114 which is similar to central portion 36 of knife 1 and together form modified frame 124. Arms 112 and 113 have curved inner surfaces which form a continuous concave surface for the mounting of blade holder 111 thereon by a pair of mounting bolts 115 and 116. Arm 112 is formed integrally with central portion 114 and arm 113 is the removably mounted arm which is secured to blade holder 111 by mounting bolt 115. Bolt 116 may be similar to bolt 51 and is provided with a thumb nut 117 at one end for adjusting the internal diameter of blade holder 111 with tool 98 in the same manner discussed above with respect to knife 1. Arm 113 includes a curved projection 118 similar to projection 69 of arm 35 which is matingly engaged within a complementary shaped cutout 119 similar to cutout 78. A similar locking collar 120 is slidably mounted on handle 3 for clamping engagment with the rear surfaces of arms 112-113 and central portion 114.

Blade holder 111 (FIG. 21) includes a scalloped-shaped shaped mounting flange indicated generally at 122 for mounting the blade holder on the concaved front end of modified knife 110. Mounting flange 122 has a concaved inner surface 123 and a convex outer surface which mates with the front concave surface of frame 124 formed by arms 112-113 and central portion 114. Mounting flange 122 is formed integrally with a ring-shaped blade mounting portion indicated generally at 126. Portion 126 is formed by a top radially inwardly extending wall 127, an axially extending side wall 128, and a bottom radially extending wall 129 which forms a U-shaped channel 132 to slidably trap the upper gear tooth blade portion 133 of a cutting blade 134 therein as shown in FIG. 22. Channel 132 preferably extends completely about the periphery of blade 134 instead of only part way as in blade holder 27. A generally circular recess 130 (FIGS. 18 and 21) is formed in convex outer surface of mounting flange 122 in which the pinion gear teeth 17 are located.

Figure 21:
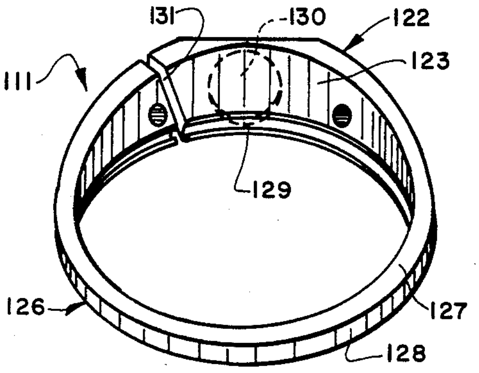
FIG. 21 is a perspective view of the blade holder removed from the modified meat trimming knife of FIG. 16.
Figure 19:
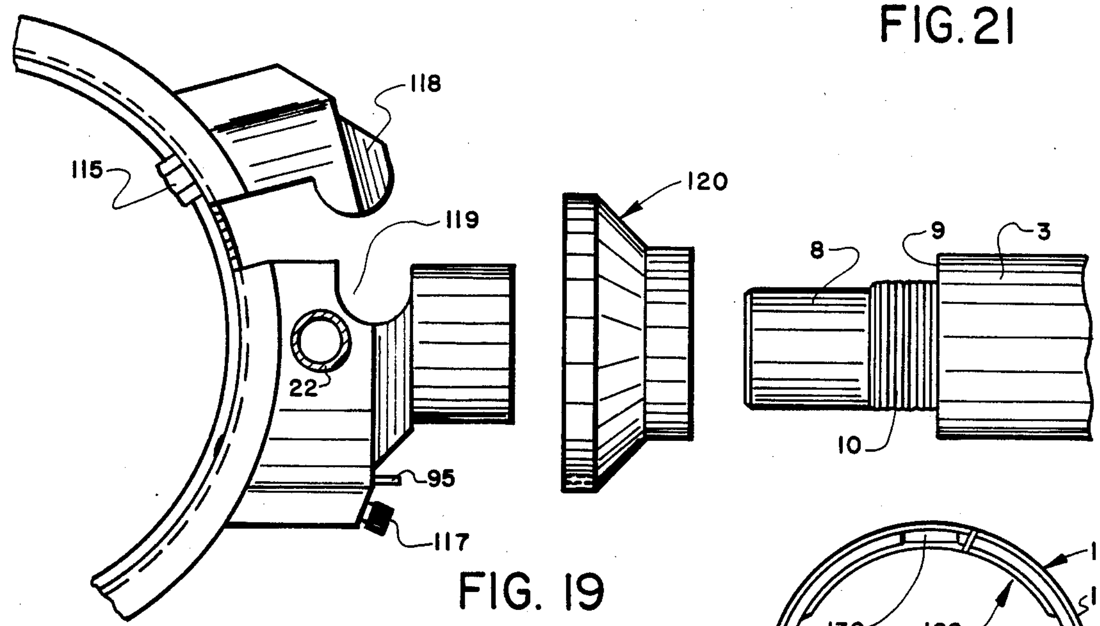
FIG. 19 is an enlarged bottom plan view similar to FIG. 17 with the knife being shown in an exploded position.
Figure 23:
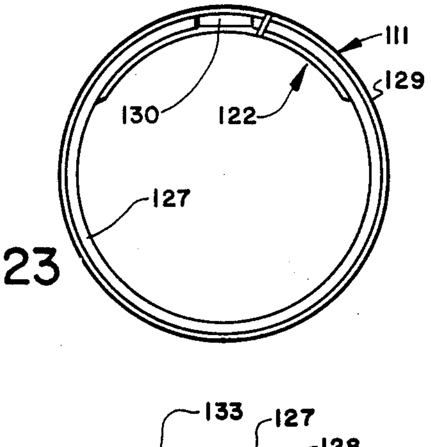
FIG. 23 is a bottom plan view of the blade holder of FIG. 21.
Figure 20:
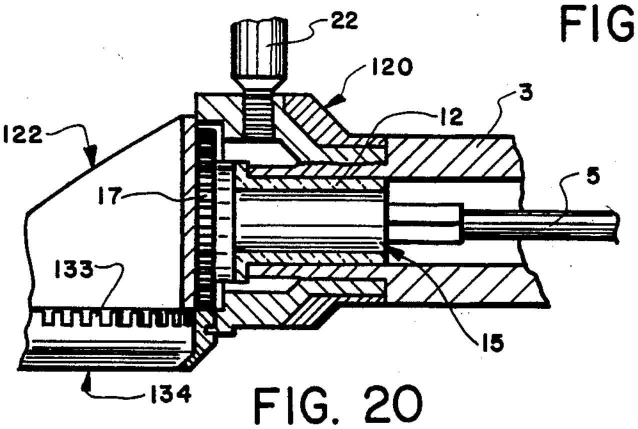
FIG. 20 is an enlarged fragmentary sectional view taken on line 20—20, FIG. 16.
Figure 22:
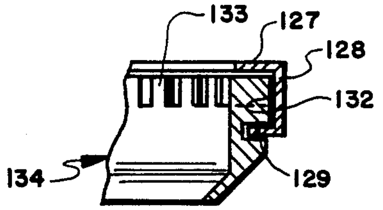
FIG. 22 is an enlarged fragmentary sectional view taken on line 22—22, FIG. 16.

Again one of the important features of the modified meat trimming knife 110 in addition to the quick blade change feature provided by removably attached arm 113, is the offset location of split 131 in the blade holder from the axial center line and pinion gear recess 130 to provide the continuous blade supporting wall 129 immediately beneath and in the area of the pinion gear recess 130 as shown particularly in FIG. 21.

Embodiment 110 shows that the arcuate length and configuration of the blade holder supporting arms of the improved knife can vary without effecting one of the main concepts of the invention that is, a split blade holder that is mounted on a pair of arms, one of which is removable with respect to the other and secured thereon by locking means such as a collar which enables the blade holder to be expanded sufficiently outwardly for the installation of a blade on and removal from the holder without complicated adjustments and manipulations. The blade holder split for both knives 1 and 110 is aligned with the junction of the removable arm with the central portion of the frame as shown particularly in FIG. 6 and 16 so that when arms 35 and 113 are in the blade removal position the separation points align with each other so that the removable arm and attached end of the blade holder move out in unison from the remaining portion of the frame.

Accordingly, the improved meat trimming knife is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved meat trimming knife is constructed and used, the characteristics of the construction, and the advantageous, new and useful results obtained; the new and useful structures, devices, elements, arrangements, parts, and combinations, are set forth in the appended claims.

What is claimed is:

1. An improved meat trimming knife including:

(a) a handle;

(b) a frame secured to the front end of the handle having a central portion and a pair of outwardly extending arms providing a concave front end to the frame, with one of said arms being removably mounted with respect to the other of said arms and central portion of the frame for movement between a blade securing position and a blade removal position;

(c) a ring-like blade holder mounted on the frame, said holder being split at one location on its circumference located at the concave front end of the frame adjacent the mounting location of the removable arm on the central portion;

(d) a pair of attachment means, each being associated with a respective one of the arms, for attaching the blade holder to a respective one of said arms on opposite sides of the split;

(e) a ring blade rotatably mounted on the blade holder having gear teeth formed circumferentially about one edge, (f) a power driven gear rotatably mounted within the central portion of the frame for meshing driving engagement with the gear teeth of the ring blade for rotating said ring blade on the blade holder;

(g) said split location being circumferentially spaced from said power driven gear; and (h) clamping means engageable with the frame and removably mounted arm for securing said removably mounted arm the blade securing position on the frame.

2. The meat trimming knife defined in claim 1 in which the central portion of the frame and the handle have a common axial centerline, and in which the blade holder split is offset from said centerline and is located adjacent to the point of engagement between the removably mounted arm and the central portion of the frame.

3. The meat trimming knife defined in claim 1 in which the blade holder has sufficient resiliency to permit outward opening movement of the blade holder to increase its inner diameter upon movement of the movably mounted arm from the blade securing position to the blade removal position when the holder is attached by one of the attachment means to said removably mounted arm to enable the blade to be mounted on and removed from the expanded blade holder.

4. The meat trimming knife defined in claim 1 in whicn the handle is movably attached to the frame by a threaded connection therebetween; and in which the clamping means includes a collar telescopically mounted on the handle and is clampingly engaged with the frame upon threaded engagement of the handle and frame.

5. The meat trimming knife defined in claim 4 in which the collar has a conical inner surface which clampingly engages a complementary shaped conical surface formed on the rear of the frame when the handle is secured to the frame to clamp the removable arm in the blade securing position.

6. The meat trimming knife defined in claim 5 in which the handle has an externally threaded cylindrical portion which engages an internally threaded portion formed in the central portion of the frame to attach the handle to said frame; and in which a shoulder is formed on the handle adjacent the threaded portion and engages the collar to clamp said collar against the frame.

7. The meat trimming knife defined in claim 1 in which groove means is formed in the concave front end of the frame for receivably mounting the blade holder thereon.

8. The meat trimming knife defined in claim 7 in which a recess is formed in the concave front end of the frame in axial alignment with the handle for receiving the power driven gear therein.

9. The meat trimming knife defined in claim 8 in which the gear recess is partially enclosed by a cover plate.

10. The meat trimming knife defined in claim 1 in which adjustment means is provided on the frame for adjusting the diameter of the blade holder to compensate for wear of said holder.

11. The meat trimming knife defined in claim 10 in which the blade holder adjustment means includes a hand manipulated tool engageable with the blade holder adjacent a portion of the frame for slidably moving one end of the blade holder along said frame portion after loosening the respective attachment means which clampingly engages said one end of the blade holder.

12. The meat trimming knife defined in claim 1 in which the blade has a cutting edge formed about a circular edge opposite from the gear teeth; in which the blade further includes an outer conical surface and an outer radial surface connecting the conical surface to the gear teeth; and in which the blade holder is formed with a radially inwardly extending surface which slidably engages the radial blade surface to support the blade on said housing.

13. The meat trimming knife defined in claim 12 in which the radial blade holder surface extends about the circumference of the holder a distance greater than 180° from a location adjacent the outwardly extending arms toward an outer portion of the holder opposite the frame.

14. The meat trinming knife defined in claim 1 in which a recess is formed in a front end of the frame for receiving the power driven gear therein; in which the blade holder is formed with a recess axially aligned with the gear receiving recess.

15. The meat trimming knife defined in claim 14 in which the blade holder has a generally radially inwardly extending wall which slidably supports the ring blade thereon; and in which said radial blade supporting wall extends continuously beneath the blade holder recess.

16. The meat trimming knife defined in claim 15 in which the blade holder includes a scalloped blade holder mounting flange and an integral ring-shaped blade supporting member.

17. A blade holder for rotatably mounting a ring like blade on the outer end of a handpiece of a meat trimming knife for driving engagement with a power driven pinion gear rotatably mounted within the handpiece; said blade holder being a unitary one piece metal member including:

(a) an annular wall that extends in the same generally axial direction as the blade extends;

(b) a blade supporting wall extending generally radially inwardly from the annular wall for slidably supporting the blade thereon;

(c) a recess formed in the annular wall for receiving the pinion gear therein for meshing driving engagement with gear teeth formed circumferentially along one edge of the blade;

(d) a common split formed in the annular wall and blade supporting wall adjacent to and circumferentially spaced from the pinion gear receiving recess; and (e) said blade supporting wall extending a predetermined arcuate distance from the split continuously circumferentially beneath the pinion gear receiving recess to provide a solid support wall for the blade completely across said recess.

18. The blade holder defined in claim 17 in which the blade supporting wall extends from both sides of the split a total of at least 180°.

19. The blade holder defined in claim 18 in which the pinion gear receiving recess has an arcuate configuration.

20. The meat trimming knife defined in claim 1 in which the pair of arms have arcuate configurations.

21. The meat trimming knife defined in claim 1 in which the power driven gear is a pinion gear.

22. The meat trimming knife defined in claim 1 in which the attachment means are bolts.

* * * * *